US008564879B1

(12) United States Patent
Eaton et al.

(10) Patent No.: US 8,564,879 B1
(45) Date of Patent: Oct. 22, 2013

(54) MULTISPECTRAL INFRARED SIMULATION TARGET ARRAY

(75) Inventors: Deran S. Eaton, Waldorf, MD (US);
Robert M. Daily, Swan Point, MD (US);
Yolanda Torres, Bel Alton, MD (US);
Joseph J. Dulcey, Waldorf, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 880 days.

(21) Appl. No.: 12/798,166

(22) Filed: Mar. 26, 2010

(51) Int. Cl.
*G06K 7/10* (2006.01)

(52) U.S. Cl.
USPC ............... 359/350; 250/495.1; 250/505.1; 345/949

(58) Field of Classification Search
USPC ............... 250/493.1, 494.1, 495.1, 505.1; 359/350; 345/1.3, 905, 949, 952
See application file for complete search history.

(56) References Cited

U.S. PATENT DOCUMENTS

| | | |
|---|---|---|
| 4,724,356 A | 2/1988 | Daehler |
| 4,859,080 A | 8/1989 | Titus et al. |
| 5,268,828 A | 12/1993 | Miura |
| 5,410,328 A | 4/1995 | Yoksza et al. |
| 5,576,553 A | 11/1996 | Adachi |
| 5,596,185 A | 1/1997 | Bross et al. |
| 5,910,659 A | 6/1999 | Johnson et al. |
| 5,949,081 A | 9/1999 | Ashley et al. |
| 6,316,777 B1 * | 11/2001 | Parrish et al. ............... 250/495.1 |
| 6,465,798 B1 * | 10/2002 | Hoelter et al. ............. 250/495.1 |
| 6,811,267 B1 | 11/2004 | Allen et al. |
| 7,048,384 B2 | 5/2006 | Cole et al. |
| 7,106,435 B2 | 9/2006 | Nelson |
| 7,145,159 B2 | 12/2006 | Bobrov et al. |
| 7,403,332 B2 * | 7/2008 | Whitehead et al. ........... 359/443 |
| 7,413,309 B2 * | 8/2008 | Whitehead et al. ............ 353/30 |
| 7,511,274 B2 | 3/2009 | Johnson et al. |
| 8,199,401 B2 * | 6/2012 | Ninan et al. .................. 359/443 |
| 2002/0074522 A1 | 6/2002 | Zakar |
| 2005/0241384 A1 | 11/2005 | Stephens et al. |
| 2010/0097294 A1 * | 4/2010 | Kastrup ......................... 345/1.3 |

OTHER PUBLICATIONS

J.R, Dupuis, et al., Two-Band DMD-Based Infrared Scene Simulator, Proc. of the SPIE, vol. 7301, 2009.

(Continued)

*Primary Examiner* — Thuy Vinh Tran
(74) *Attorney, Agent, or Firm* — Fredric J. Zimmerman (57) ABSTRACT

A composite infrared target simulation display system for field testing of infrared (IR) search and track, guidance and general sensory systems. The system includes one or more tileable emitter arrays scalable without systemic size limitation. The emitter arrays are square faced tiles housing power and control electronics to autonomously display a stored infrared test image according to parameters distributed by a control host and a timing signal. A face of the emitter array is divided into regularly spaced pixel positions, each made up of multiple IR emitters operating in differing regions of the IR band to display an image. Multiple emitter array tiles are joined to form a complete system. Each emitter of each pixel position is individually addressable to be individually controllable with respect to emittance state for displaying an image. Multiple images may be sequentially displayed to replicate a simulated target signature in motion.

18 Claims, 7 Drawing Sheets

(56) References Cited

OTHER PUBLICATIONS

K. Sparkman et al., MIRAGE WF Infrared Scene projector System, with 1536×768 Wide Format Resistive Array, Performance Data, Proc. SPIE, vol. 7301, 2009.

P. Bryant, S. et al, Bolometers Running Backward: The Synergy Between Uncooled IR Sensors& Dynamic IR Scene Projectors, Proc. of the SPIE, vol. 6207, 2006.

N. Das, Midwave IR LED array for High-temperature target simulation, SPIE Newsroom-The International Society for Optical Engineering, 2006.

N.C. Das, P. Shen, G. Simonis, J. Gromes, K. Olver, Light Emittinf Diode Arrays for HWIL sensor testing, Proc. of SPIE, vol. 5785, 2005.

D.A.Saylor, Army Aviation and Missile Command Redstone Arsenal, AL, Current Status of IR Scene Projection at the U.S Army Aviation and Missile Command, 2001.

D. B. Beasley et al., Dynamic IR Scene projector Based Upon the Digital Micromirroe Device, Proc. SPIE 4366, p. 96, 2001.

S. McHugh, et al., MIRAGE: Large-Format Emitter Arrays 1024×1024 and 1024×2048, Proc. SPIE 4027, p. 399, 2000.

\* cited by examiner

MULTISPECTRAL INFRARED SIMULATION TARGET ARRAY

STATEMENT REGARDING FEDERALLY SPONSORED RESEARCH OR DEVELOPMENT

The invention described herein was made in the performance of official duties by an employee of the Department of the Navy and may be manufactured, used, licensed by or for the United States Government for any governmental purpose without payment of any royalties thereon.

FIELD OF THE INVENTION

The invention relates to modular large scale emissive multispectral infrared arrays and more specifically relates to a field deployable infrared sensor test target system capable of rendering full motion infrared target and background images.

BACKGROUND OF THE INVENTION

Advances in machine intelligence and automation have necessitated concomitant advances in machine environmental and situational awareness. A variety of environmental information sources are available to machine controlled systems, many of which rely on sensors to identify ambient environmental conditions and to identify changes in conditions related to events occurring in the surrounding environment. Sensor technologies have thus been a focus of research and development efforts and have been enhanced and improved accordingly. The ability to test and verify the performance of enhanced sensor technologies has necessarily improved as well.

Conventional infrared sensor testing equipment is rooted in projection-type technologies. Typical systems utilize a resistive focal plane array (RFPA) or filtered blackbody in conjunction with expensive and mechanically cumbersome optical elements (mirrors, lenses, filters, windows, etc.) to convey test target images to the aperture of a sensor under test. Such systems also typically require laboratory operating conditions, attachment to motion simulation machinery or precision placement on a vibration-isolated test stand. RFPAs utilizing pixel arrays built at the integrated microcircuit level are, while capable of producing high definition image resolutions with excellent intensity variability, operationally limited to a narrow spectral bandwidth (usually in the 3-5 µm wavelengths) and confront diffraction limitations owing to the element size. Blackbody sources are similarly limited with respect to spectral range and are further limited by their iron block heating element, which is both time and energy intensive to heat and static in terms of illumination behavior such that filter plates, diffraction plates, aperture wheels, shutters and the like are necessary to create even a rudimentary test target projection scheme. Both are limited by system development and construction costs and are often confined to controlled environments due to their costs thereby ruling out meaningful field use.

A robust, field deployable large scale emissive multispectral infrared array sensor test target system capable of rendering full motion infrared target and background images that is inexpensive to build, maintain and operate would thus be desirable.

SUMMARY OF THE INVENTION

The present invention provides a composite infrared (IR) target simulation display system for field testing of infrared search and track, guidance and general sensory systems. The system is made up of one or more tileable emitter arrays and is scalable without systemic size limitation. The emitter arrays are square faced tiles housing power and control electronics to display, autonomously, a stored infrared test image according to parameters distributed by a control host and according to a timing signal provided by the control host. A face of the emitter array is divided into horizontally and vertically regularly spaced pixel positions, each of which is made up of a multiple infrared (IR) emitters operating in differing regions of the IR band to display the image. Multiple emitter array tiles are joined to form a complete system. Each emitter of each pixel position of each tile is individually addressable so as to be individually controllable with respect to emittance state for each image to be displayed. Multiple images may be displayed in sequence to replicate a simulated target signature in motion.

DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent exemplary embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE INVENTION

For the purposes of promoting an understanding of the principles of the invention, reference will now be made to an exemplary embodiment illustrated in the drawings, which is described below. The exemplary embodiment disclosed below is not intended to be exhaustive or limit the invention to the precise form disclosed in the following detailed description. Rather, the embodiment is chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
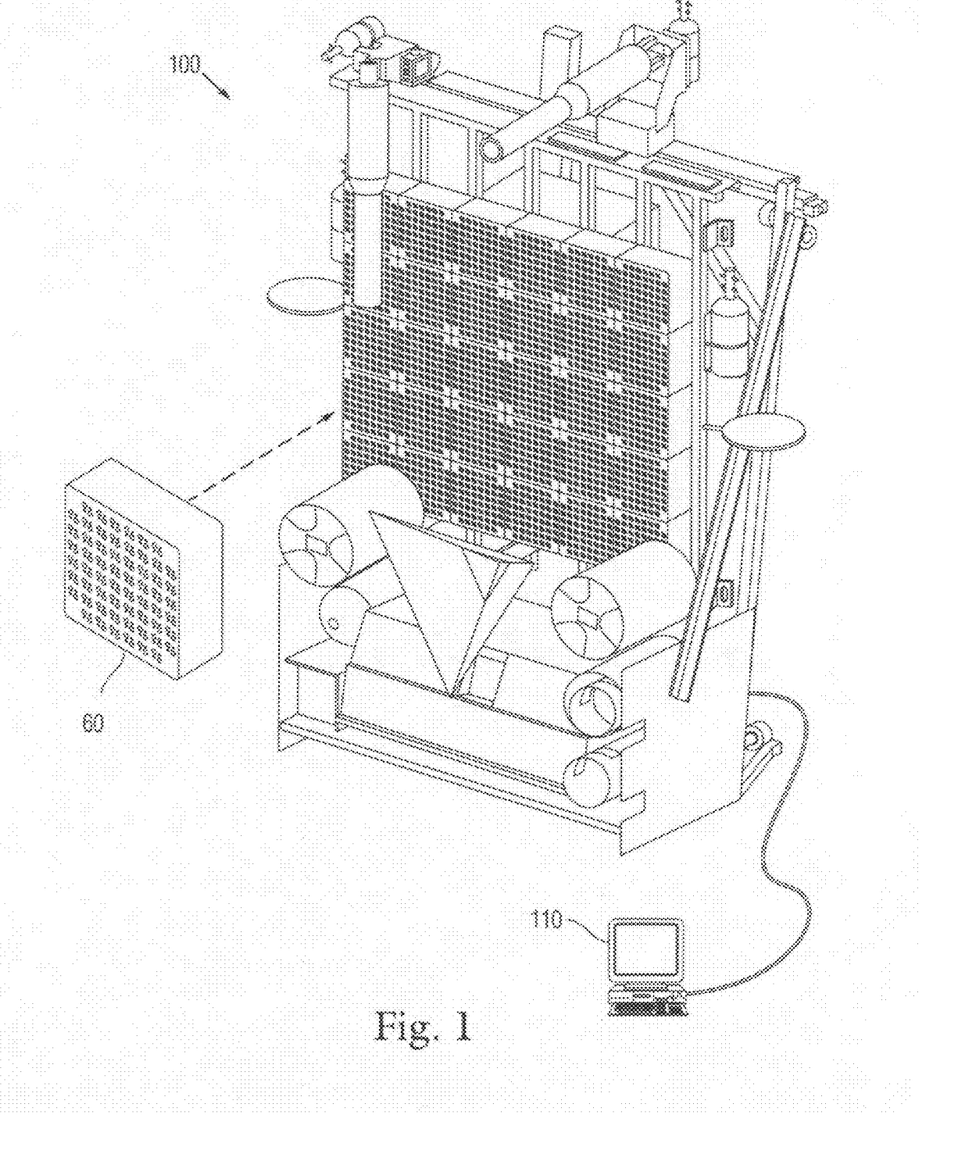
FIG. 1 is a perspective view of a target simulation display system according to the present invention.
Figure 2:
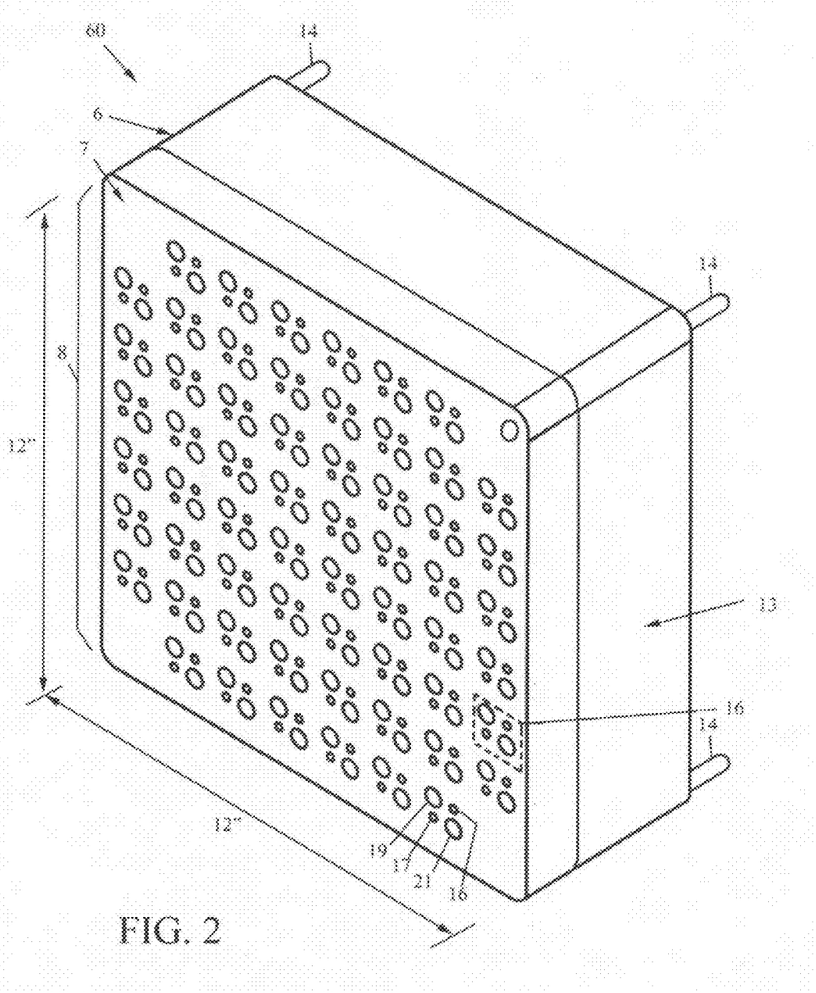
FIG. 2 is a perspective view of a single infrared array tile.

The invention is a composite infrared target simulation display system 100 sometimes referred to as multispectral infrared simulation target array ("MISTA") for field testing of infrared search and track, guidance and general sensory systems. The system 100 is made up of one or more tileable emitter arrays 60 so as to be scalable without systemic size limitation. The emitter array 60 in the exemplary embodiment of FIGS. 1-4 is housed in an enclosure 6 having a 12 inch square planar front face that forms the fundamental tile unit of this embodiment of the system 100. The front face is divided into individual pixel positions 16 in a two dimensional repeating pattern substantially covering the entire face. The exemplary embodiment utilizes a 1.5 inch square dimension d for pixel position 16 such that an 8 row by 8' column pixel pattern is formed in the face of the tile unit extending to each edge of the face. Pixel positions are omitted in this exemplary embodiment in the tile corner position to permit fasteners necessary to join the lid 7 to the enclosure 6. It is anticipated that embodiments using alternate fasteners would include pixel positions at the corners of the tile face of the array 60. Where the tile face dimension is a whole number multiple of the pixel dimension in each direction, the entire face of the tile is used and pixel spacing is maintained between pixel positions at the edge of immediately adjacent tiles. This configuration produces a seamless display. Row and column alignment is also maintained between adjacently situated emitter arrays 60, as depicted in FIG. 1.

Figure 3:
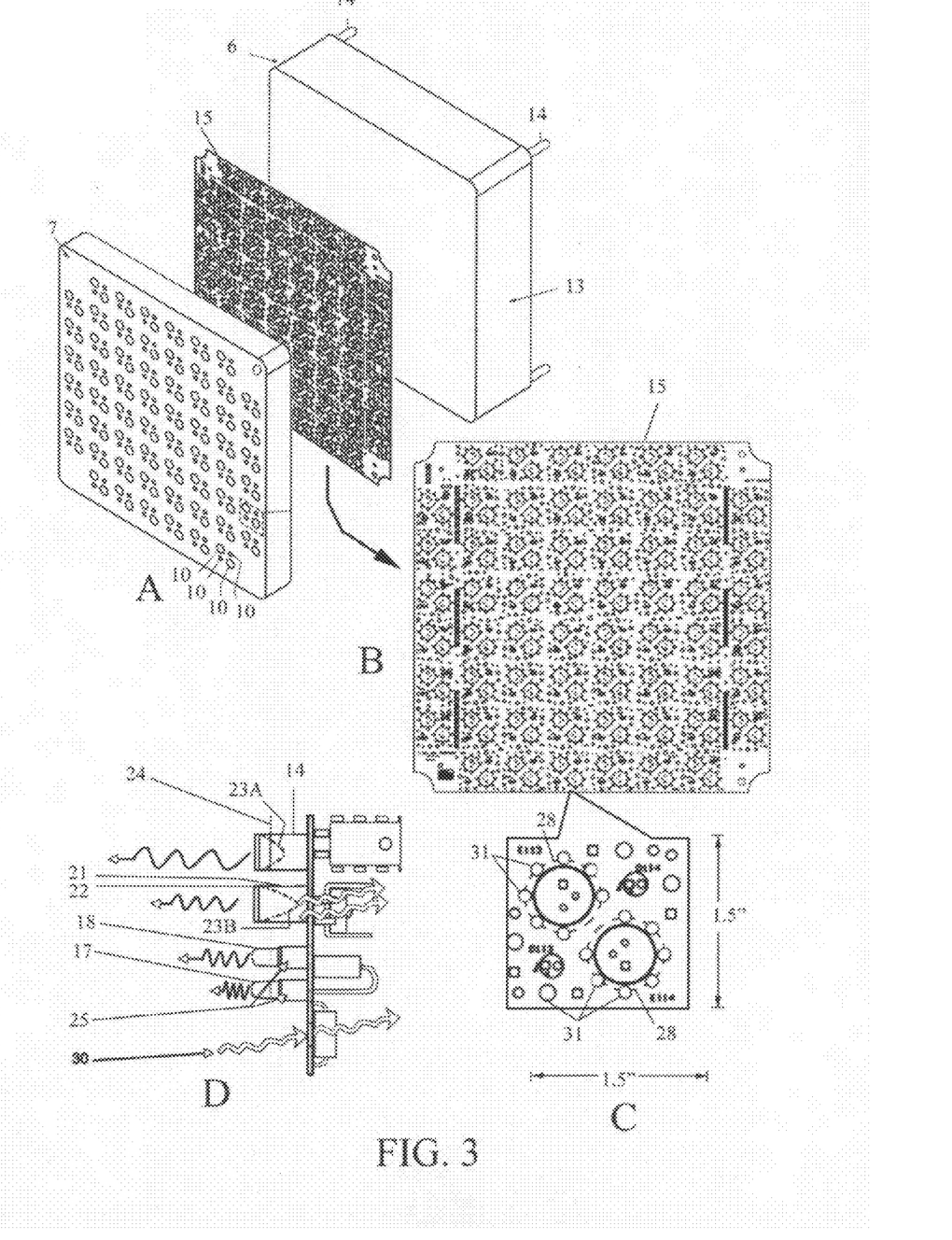
FIG. 3A is a partial perspective view of the tile housing lid subassembly with circuit card assembly.
FIG. 3B is a front view of the circuit card assembly.
FIG. 3C is a partial front view of a single pixel position on the circuit card.
FIG. 3D is a side view of a single pixel position on the circuit card assembly with emitters installed.

Each pixel position 16 includes multiple electro optical emitter elements operating in the infrared spectral wavelength. The depicted emitter pattern includes four emitters at each pixel position 16 including two emitters in the near infrared spectral wavelength and two additional emitters with one emitter in the mid-infrared spectral wavelengths and the other emitter in the long infrared spectral wavelengths. Specifically, with reference to FIGS. 2 and 3d, the pixel position 16 of the exemplary embodiment includes LED emitter element 17 operating at about 880 nm, LED emitter element 18 operating at about 950 nm, foil coil-type thermal emitter 19 with a calcite band pass filter 20 emitter element operating at about 2 μm—about 9.5 μm and MEMS film (thermal) emitter 21 with a germanium long pass filter 22 operating at about 9.5 μm—about 20 μm (excluding atmospheric absorption effects). Emitter filters 20, 22 are each characterized by 80-50 minimum scratch/dig surface quality and a minimum 80% transmissivity, with humidity-resistant adhesion. With reference to FIG. 3, emitters 17, 18, 19 and 21 are mounted alone on the front of a circuit card assembly (CCA) 15 with all emitter drive circuitry mounted on the rear of the CCA, as further described below.

CCA 15 of the exemplary emitter array 60 is housed in the removable lid 7 of enclosure 6. Enclosure 6 may be a metallic NEMA 4 type enclosure having a modified lid 7 so as to be perforated as described herein. The lid 7 is cooperatively drilled or otherwise perforated to match the arrangement of each emitter within each pixel position of the printed circuit card assembly 15. Emitter 17, 18, 19 and 21 are positioned in a single focal plane 24 (see FIG. 3d), which is positioned within the thickness of the cooperatively perforated wall of the lid 7. To maintain display plane 24 consistency, and ensure a cooling airflow gap, each LED emitter is mounted above the front surface of the circuit card assembly 15 atop a spacer 25, generally a nylon material or a non-thermally conductive materials. In the exemplary embodiment, lid 7 is constructed of a metallic material, such as, aluminum or stainless steel. The perforations 10 corresponding to each LED type emitter 17, 18 are drilled with tight tolerance around each LED device package in the form of a parabolic reflector to exploit the specular reflectivity of the metal surface exposed during drilling as a collimating reflector for the emitter. When fully assembled, focal plane 24 passes substantially through the focal point of each such drilled collimating reflector such that each LED type emitter is likewise positioned substantially at the focal point of the parabolic section. Lid 7, alternately, may be constructed of a nonmetallic material that is similarly drilled and coated with a highly reflective material on the exposed surface of the perforation to create the described collimating reflector.

The foil coil emitter 19 and MEMS film emitter 21 are each housed in an, exemplary embodiment, aluminum parabolic mirror casing 23A, 23B, which serves to better collimate their respective outputs. The focal point of casings 23A, 23B are similarly positioned on focal plane 24 when the array 60 is fully assembled. Perforations 10 in the lid 7 corresponding to thermal type emitters 19 and 21 are sized to receive the collimating reflectors 23A, 23B with an additional air gap to permit and promote cooling airflow 30 as further described below. The additional radial air gap is, in an exemplary embodiment, about 0.05 inches for the exemplary array 60. Since only emitters and spacers corresponding to apertures occupy the front face of the array circuit card assembly 15, the card may be directly mounted within the lid 7 with the emitters situated within the corresponding holes drilled into the thickness of the lid and on the focal plane 24. The outside face of array 60 optionally hosts a louver grid (not shown) to reduce infrared noise from sunlight during daytime outdoor operations.

Test results of a system constructed according to the present invention determined that thermal emitters 19, 21 experienced their best "ON-OFF-ON" cycling response when actively cooled. As such, each array pixel position 16 and its drive circuitry are provided with both conductive and forced air convective cooling. With respect to conductive cooling, the design layout cell (see FIG. 3c) of each thermal emitter 19, 21 is provided with, in an exemplary embodiment, a copper pad 28 rear-mounted to circuit card assembly 15 to achieve uniform thermal flow and promote heat dissipation. Copper pad 28 may be adhered to the reverse of the CCA 15 by any of a variety of thermally conductive adhesives, such as, any of a variety of noncorrosive, thermally conductive silicone adhesives. Further, thermally dissipating layout cells for all emitters (i.e. for both LED type emitters 17, 18 and thermal type emitters 19, 21) are provided with airway holes 31 through circuit card assembly 15.

Figure 4:
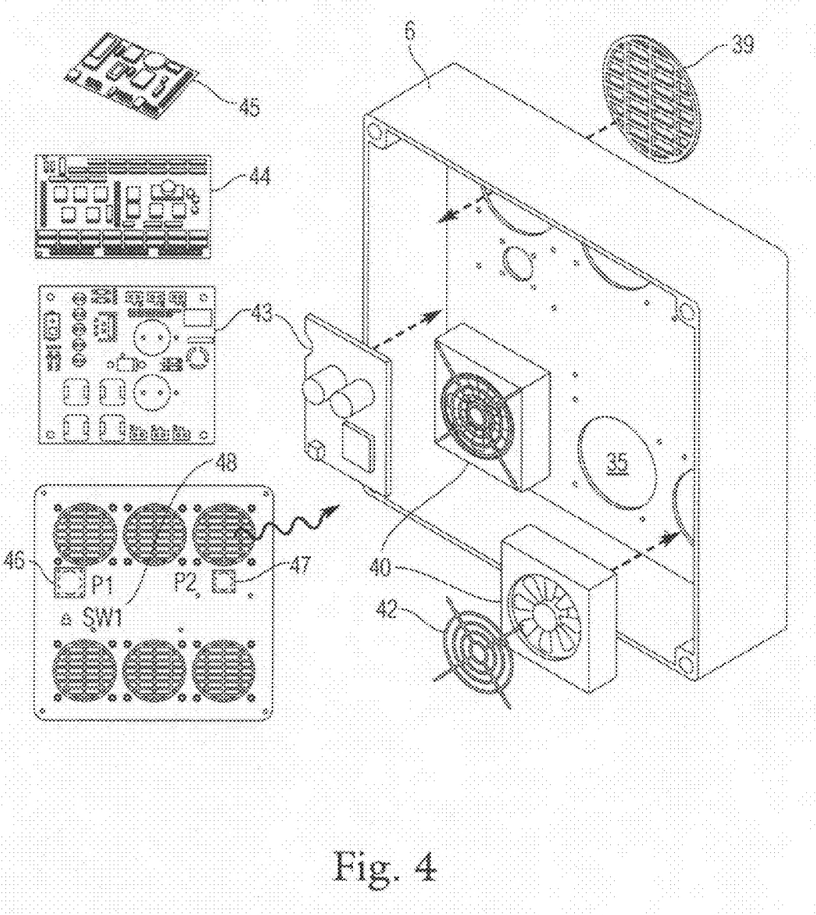
FIG. 4 is an exploded perspective view of the tile housing without the lid.

With reference to FIG. 4, enclosure 6 is generally provided with a number of vent holes 35, for example, in an exemplary embodiment, six vent holes 35 in its rear face. Vent holes 35 are each filled by a louvered vent cover 39 and it is observed that the rear orientation of vent holes 35 as well as all other input/output, power and control elements (discussed below) permits multiple arrays 60 to be positioned immediately adjacent to one another into a single display system 100 without impeding air flow, access or pixel alignment as previously discussed. A +12 VDC powered fan 40 with cable chafing guard 42 is positioned over five of the louvered vents 39 exhausting outward through holes 35. Operation of fans 35 negatively pressurizes the inside of enclosure 6 thereby drawing air through the emitter perforations 10 in the lid 7 (and in particular through the radial air gaps around the thermal emitters). Air is further drawn through airway holes 31 of CCA 15 to provide active convective cooling of the emitters 17, 18, 19, 21, the copper pad 28, and the resistors 32, 33 and, optionally, heat sinks 34 of the emitter drive circuits on the rear surface of the CCA before being exhausted through holes 35. In this manner, excess heat is dissipated through the rear of the array 60 and system 100 so as not to interfere with IR sensor test emission from the face of the array.

With continued reference to FIG. 4, enclosure 6 also houses the drive and control circuitry for the emitters 17, 18, 19, 21 including power boost converter 43, Input/Output (I/O) controller 44 and logic processor 45. Power boost converter 43 accepts low power voltages down to about +5 VDC (nominally +6 VDC) and converts it up to +12 VDC (up to 7.5 A) before distributing it each cooling fan 40, I/O controller 44 and logic processor 45. The boost converter 43 enables the array 60 to operate from mobile or otherwise portable DC power sources such as batteries, fuel cells or generators.

In the exemplary embodiment, I/O controller 44 is a Tern, Inc. P300 input/output controller having 264 I/O lines and capable of directly and individually driving each of the emitters of the array 60. This I/O card is sufficient given the number of emitters and pixel positions of the exemplary embodiment. Two channels of RS-232 drivers and/or one RS-485 driver are provided along with a 5V linear regulator which can power the P300 as well as any installed processor board (logic controller) from the 12V provided by the boost converter 43.

In an exemplary embodiment, the P300 input/output controller is driven by the logic controller 45 which, in the exemplary embodiment, is a Tern, Inc. A-Engine AE86. The A-Engine is a C/C++ programmable microprocessor module based on a 40 MHz, 16-bit CPU (Am186ES, AMD). The A-Engine utilizes a 16-bit external data bus and supports on-board 512 KB 16-bit field programmable Flash memory and up to 512 KB 16-bit battery-backed SRAM. The A-Engine (logic controller 45) connects as a modular assembly directly to the P300 (I/O Controller 44), thereby permitting data processor upgrades without having to replace the whole electronics package. All key electronics are coated to mitigate moisture effects from outdoor operations.

It should be noted that alternate processing engines equipped with Ethernet and memory sufficient to hold 15-30 minutes of MISTA frames may be utilized to build a MISTA array. Variations in emitter type (e.g., infrared membranes, LED sub-arrays) and pixel density are also feasible provided the chosen processor engine and I/O modulation distribution engine are capable of driving each pixel's emitters individually. Generally, the bigger the MISTA array per unit, the more powerful the processor and I/O capacities must be, which is a reason that MISTA is, in an exemplary embodiment, implemented as a tiled display. Further, alternate power sourced from the exemplary +6 VDC (with boost converter) and LED modulation may be changed to vary LED intensity around the LED's "knee" voltage (instead of frequency) using a frequency-to-voltage converter per LED.

During assembly, the P300 I/O controller 44 and A-Engine logic controller 45 are set in place within the enclosure 6 and screwed down, atop spacers as required for a stacked parallel fit. It is desirable that the processor of the A-Engine be positioned over the sixth rear hole 35 which, not having a fan, permits air to be drawn in though the louvered cover 39 of that hole to cool the processor as a result of the afore mentioned negative pressure generated by the exhaust fans 40. The stacked parallel fit ensures that the desired airflow is not impeded. A power connector P1 46, control data interface connector P2 47 are fitted through the rear wall of the enclosure for connection to external power and data buses. A power switch SW1 48 is also rear mounted. Rear mounting of all enclosure penetrations is generally used so as not to impact the ability to arrange multiple arrays 60 immediately adjacent to one another as noted.

Figure 5:
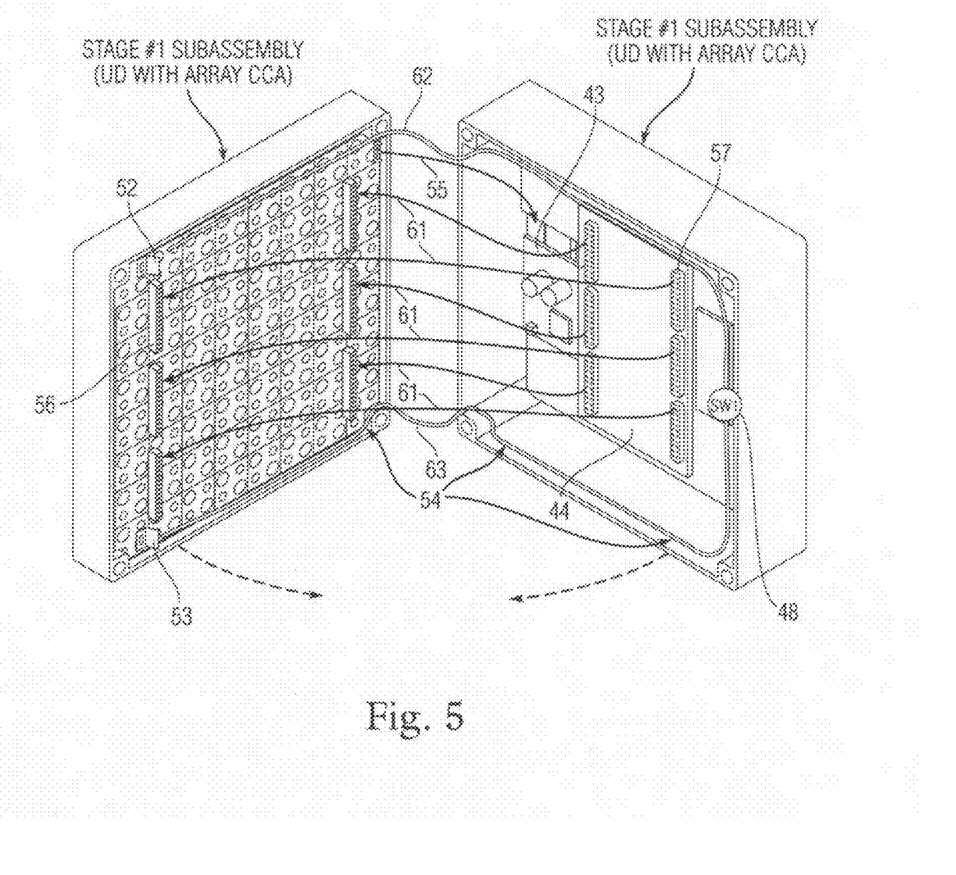
FIG. 5 is a perspective view of the tile housing and lid subassemblies being joined.

With reference to FIGS. 3A and 5, the final tile unit hardware assembly brings together the lid 7 (with populated CCA 15) and enclosure 6 (with control and cooling elements) to complete the wiring and stackup. Wiring completion requires +6 VDC power 52 and ground 53 route from SW1 48 to respective connections on the emitter array assembly and the boost converter 43, at its J1 connection. Power and ground wires 62, 63 should run along housing 6 anchor points 54 such that they from a "hinge" to seal the assembly neatly without tangling P2 data and array test point connections 55 should also be routed to the data processor 45 (obscured in FIG. 5). As FIG. 5 shows, the J1-J6 emitter array connectors 56 should pair identically with the six input-output T1-T6 drive connectors 57 on the P300 controller 44. On a 1:1 basis, a ribbon cable 61 matches J1 to T1, J2 to T2, and so on until all six ribbon cables are installed. The two halves are closed and screwed together resulting in a stacked parallel fit that completes the array 60. Multiple arrays 60 may be arranged into a larger composite infrared target simulation display system 100, as shown in FIG. 1. A mobile, mechanical framework for securing multiple arrays 60 together such as the 30 square foot 5 tile×6 tile array of FIG. 1 is only one exemplary embodiment demonstrating how the system's modularity is tailorable for a variety of host targets up to the power supply and data networking (as described below) limits the host can support.

Figure 6:
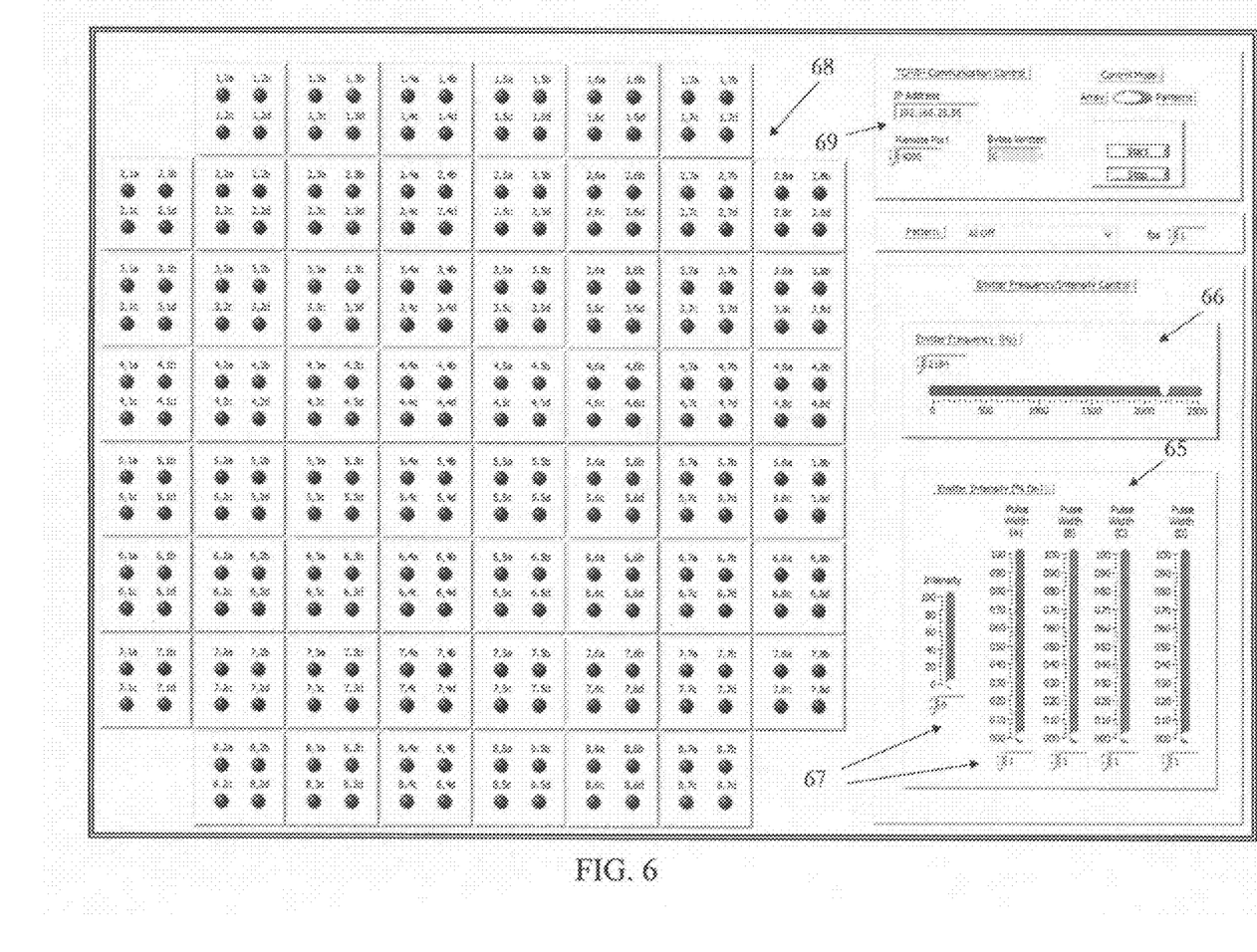
FIG. 6 is a screen shot of the host controller software.

Display system 100 is programmed, controlled and operated by host controller 110, generally a personal computer or workstation, communicating with each array 60 in the system 100 via a communications bus or network. With reference to FIGS. 1 and. 6, the exemplary embodiment utilizes a graphical user interface developed using National Instruments' LabView 8.5 development environment and the Tern, Inc. C/C++ Microcontroller API to program, control and operate system 100 via a host controller 110. Referred to as the Multispectral IR Array Nodal Distribution Algorithm (MIRANDA), the graphical user interface permits the system operator to have pixel-level control for each array 60. Specifically, each emitter is individually addressable so that the operator can specify for each pixel the emitting wavelengths 65 (by providing the desired emitters with non-zero pulse widths) as well as the operative pulse width frequency 66 and specific pulse width (intensity) 67.

After selecting one or more emitters in the image composition frame 68 the emitter pulse width is selected. The pulse width frequency 66 represents how hard emissions are driven when fully active (i.e., how much power each emitter receives) and, specified in hertz, defines the on-off-on cycle time. Generally, the modulation wave for each emitter is at least one order of magnitude faster (or held at DC) than the targeted 30 fps frame rate, that is, the recognized minimum for full motion video. The infrared emitters in particular are fundamentally heat emitters, which means their response time is the real determiner of the frame rate, not the modulation frequency. This frame-rate is emitter-specific. For example, the near infrared LEDs may be switched very quickly so they are cycled to match the frame rate if desired. The MEMS infrared emitter response time limits its frame rate to about 24 fps (effectively), but the modulation frequency it receives determines its emission strength within any given frame. Likewise, this relationship holds true for the foil coil emitter, but its power consumption requirement is higher for a given response which limits its frame cycling to 4 fps. Emitter pulse width (intensity) 65 may be set individually for each emitter, (labeled a, b, c and d for addressing purposes), by specifying pulse width in the "on" state as a percentage of an emitter's pulse width frequency 66. Pulse width (intensity) 67 can be adjusted collectively for each emitter in a particular pixel where a pattern has mixed pulse widths for the same emitter. Emitter intensity 67 varies all preset pulse width values by a fixed amount. Setting a particular emitter's intensity to 0% "on" time deactivates an emitter in the specified frame such that no emissions in that wavelength occur.

Figure 7:
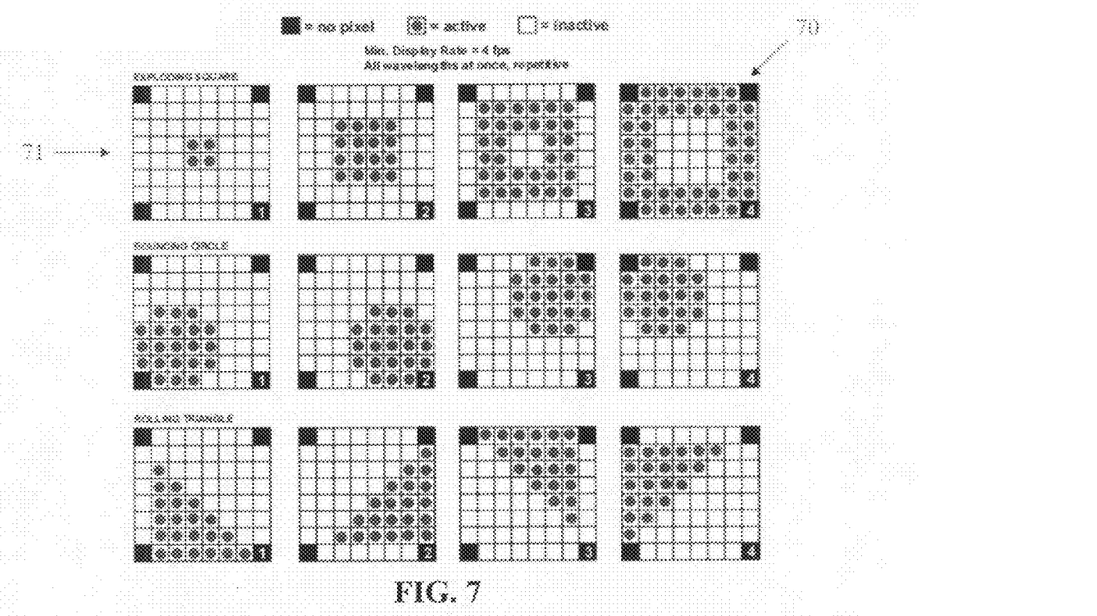
FIG. 7 is a mapping of emitter frame sequences for test images on a single array.
Figure 8:
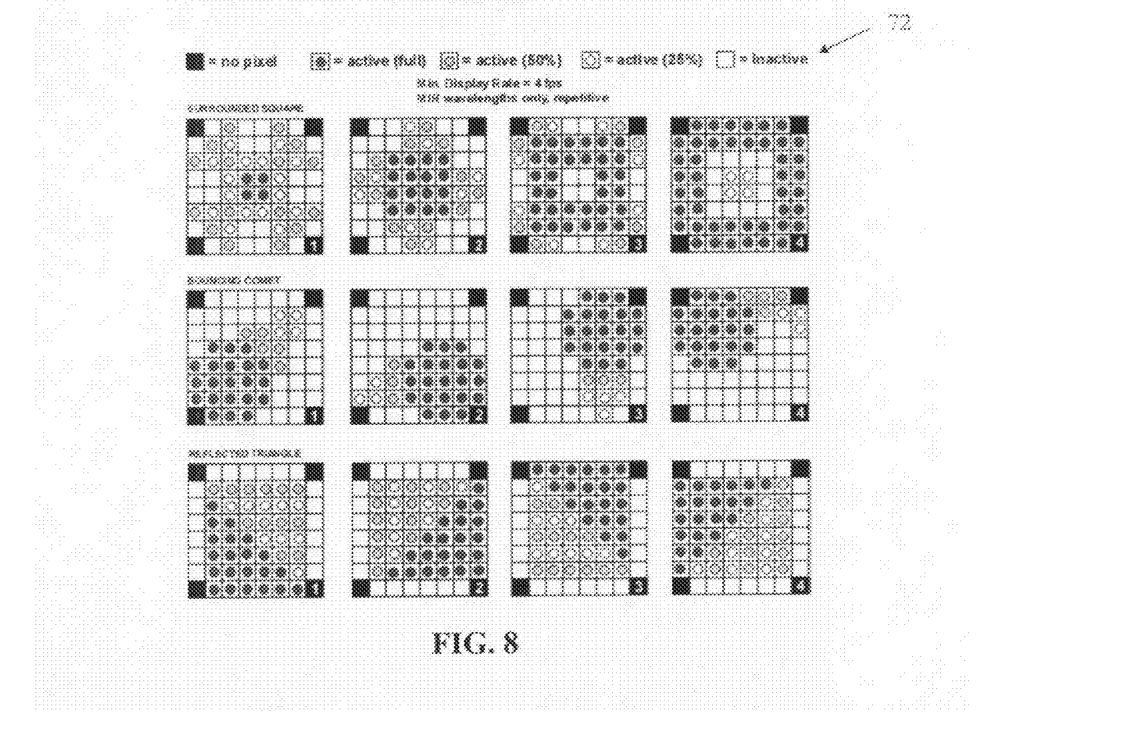
FIG. 8 is a mapping of emitter frame sequences for test images on a single array.

Image composition frame 68 is used to determine the simulation pattern 70 (FIG. 7) displayed by a particular array in a given frame. Image sequencing 69 allows the user to specify a series of simulation patterns to be displayed in sequence 71 (FIG. 8). Image compositions may be individually created by a user or may be imported from stock images through the use of image sampling and conversion algorithms as described below. Although the exemplary simulation pattern 70 and/or series 71 utilize a single array, it should be understood that a simulation pattern 70 would generally span multiple arrays in a system according to the present invention in which each array displays only a portion of the pattern but which, taken as a whole, defines a larger test image. Image patterns and sequences may be stored in long term memory for later recall, modification and/or distribution to the arrays 60 for display.

For still images, once a simulation pattern 70 is defined by the operator by specifying the above parameters for each emitter of each pixel position of each array 60 or imported/sampled from another source, MIRANDA compiles and uploads the infrared simulation data to the addressed arrays 60 via the communications network where it is received by the I/O controller/logic processor and stored in memory. Notably, each emitter of each pixel of each array is discretely addressable such that only the emissive state parameters of each individual emitter in a particular array need be stored in the memory of that array, although may be stored as well. Once the host controller uploads the desired infrared simulation image, MIRANDA signals the arrays 60 to display the simulation image using a time mark pulse transfer over the network. In response, the logic controller drives the appropriate circuits to energize the addressed emitters according to the previously specified and stored parameters.

Where an apparently moving target signature is desired, a series of images or frames 71 may be defined by the operator and uploaded to each array 60 where they are stored in memory. MIRANDA signals each array 60 to display a real-time synchronized, simulation image sequence using the same time mark pulse transfers. In response the logic controller drives the appropriate circuits to energize the addressed emitters according to the specified parameters according to the time signals. If specified by the operator, a still or moving background IR pattern may be displayed behind the primary target simulation as well by energizing emitters not associated with the primary target signature. The present system may cycle target test images at motion frame rates. Hot, slow target updates may occur at 4 fps using foil-coil emitters; fast targets at 22-30 fps using the MEMS infrared emitters; near infrared emitter LEDs in the invention may cycle patterns to the limits of the internal controller's CPU beyond 30 fps, none of which require the pre-operational warm-up or post-operational cool down time, as required by infrared black-bodies. The result is a composite infrared target simulation display, for example, a still image, an apparently moving target signature, or group of such signatures.

MIRANDA also functions as an image generation and translation processor in addition to a system controller. Original infrared target simulation patterns (FIG. 7 and FIG. 8) may be generated, or stock still image and video libraries translated through MIRANDA. MIRANDA may further utilize a sampling and conversion algorithm to translate high resolution visible light or infrared image sets for display on the present system 100.

It should be understood that the invention may be used with a variety of materials and used beyond infrared target simulation display system including a variety of applications in various illumination and lighting schemes and particularly those seeking to mitigate heat in LED illumination. Alternate applications utilize variations in how the emitter array is populated to meet the needs of a particular application. This type of custom illumination also has potential agricultural uses (e.g., hydroponics, indoor gardening, and the like). Smaller variants of the MISTA array card, which is perforated for airflow-based cooling, have potential uses in automotive lighting if the MISTA array is implemented using flex circuit joints between emitter elements. Consequently, while this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

We claim:

1. An infrared target simulation display system, comprising:
   a plurality of tiles defining a planar surface, each of said plurality of tiles comprises:
   a plurality of pixel positions on a surface of each of said plurality of tiles, each of said plurality of pixel positions organized in a two dimensional pattern having a regular inter-pixel distance in each of said two dimensions, the pixel positions at an edge of any one of said tiles positioned so as to maintain said inter-pixel distances relative to the pixel positions at an adjacent edge of another of said tiles; each of said plurality of pixel positions further comprises a plurality of infrared emitters;
   a logic controller individually controlling said plurality of infrared emitters, said logic controller comprising a microprocessor, an input/output port and memory; and
   a power converter electrically connected to said logic controller;
   a power supply being electrically connected to the power converter of each of said plurality of tiles;
   a communications bus being connected to the logic controller of each of said plurality of tiles; and
   a timing controller being connected to said communications bus and in communication with said logic controller of each of said plurality of tiles via said communications bus.

2. The infrared target simulation display system of claim 1, wherein said plurality of infrared emitters are selected from the group consisting of LED type emitters, foil coil-type thermal emitter and microelectromechanical (MEMS) film thermal emitters.

3. The infrared target simulation display system of claim 1, wherein each of said plurality of infrared emitters emit in differing portions of the infrared spectrum.

4. The infrared target simulation display system of claim 3, wherein said plurality of infrared emitters comprise
    a first emitter operating at about 880 nm;
    a second emitter operating at about 950 nm;
    a third emitter operating at about 2 μm—about 9.5 μm; and
    a fourth emitter operating at about 9.5 μm—about 20 μm wavelengths.

5. The infrared target simulation display system of claim 3, wherein said plurality of infrared emitters further comprise
    a first LED type emitter operates at about 850 nm;
    a second LED type emitter operates at about 950 nm;
    a foil coil-type thermal emitter includes a calcite band pass filter, which operates at about 2 μm to about 9.5 μm; and
    a microelectromechanical film type thermal emitter includes a germanium long pass filter, which operates at about 9.5 μm to about 20 μm.

6. The infrared target simulation display system of claim 1, wherein each of said tiles further comprises
    a housing, which includes a front wall, a back wall and an enclosed volume, said planar surface comprised of an external surface of said front wall of each of said plurality of tiles, said front wall further comprises an aperture at each of said plurality of pixel positions, and
    wherein each of said plurality of infrared emitters is housed within said enclosed volume and cooperatively positioned to emit through said aperture.

7. The infrared target simulation display system of claim 6, wherein said plurality of infrared emitters are arranged in a single plane, said plane positioned within the thickness of said front wall, said aperture of at least one emitter at each pixel position formed in the shape of a collimating reflector about said emitter.

8. The infrared target simulation display system of claim 6, further comprising at least one exhaust fan being positioned within at least one exhaust aperture in said back wall of said housing, said exhaust fan negatively pressurizes said enclosed volume so as to draw air into said housing via said plurality of apertures in said front wall.

9. The infrared target simulation display system of claim 6, wherein said plurality of infrared emitters are arranged in a single plane on a first side of a circuit card assembly, and wherein a copper pad is adhered to a second side of said circuit card assembly opposite said foil coil-type thermal emitters and said microelectromechanical film type thermal emitters are mounted on said first side of said circuit card assembly.

10. A method of displaying an infrared target simulation image, comprising:
    providing a plurality of tiles, each of said plurality of tiles comprises:
        a plurality of pixel positions on a surface of each of said plurality of tiles, said pixel positions organized in a two dimensional pattern having a regular inter-pixel distance in each of said two dimensions, the pixel positions at an edge of any one of said tiles positioned so as to maintain said inter-pixel distances relative to the pixel positions at an adjacent edge of another of said tiles; each of said pixel positions further comprises a plurality of infrared emitters;
        a logic controller individually controls said plurality of emitters, said logic controller comprising a microprocessor, an input/output port and memory; and
        a power converter electrically connected to said logic controller;
    arranging said plurality of tiles for defining a planar surface;
    providing a power supply electrically connecting to the power converter of each of said plurality of tiles;
    providing a communications bus being connected to the logic controller of each of said plurality of tiles;
    providing a host controller being connected to said communications bus and in communication with said logic controller of each of said plurality of tiles via said communications bus;
    downloading, for at least one image to be displayed, the display parameters of each emitter;
    storing, for each of said at least one image to be displayed, the display parameters of each emitter in said memory of said logic controller
    signaling by said host controller for said logic controller for energizing said plurality of infrared emitters according to said stored display parameters of a first image to be displayed; and
    energizing by said logic controller said emitters according to said stored display parameters to display said first image.

11. The method of displaying an infrared target simulation image according to claim 10, further comprising
    repeating said signaling step and said energizing step sequentially for each subsequent image to be displayed.

12. The method of displaying an infrared target simulation image according to claim 10, wherein said display parameters of each emitter include a modulation frequency value and an intensity value.

13. The method of displaying an infrared target simulation image according to claim 12, wherein said modulation frequency value is from about 2 Hertz to about 30 Hertz.

14. The method of displaying an infrared target simulation image according to claim 12, wherein said intensity value defines a percent-on pulse width.

15. The method of displaying an infrared target simulation image according to claim 10, wherein said step of providing a plurality of tiles further comprises wherein said plurality of emitters are selected from the group consisting of LED type emitters, foil coil-type thermal emitter and MEMS film thermal emitters.

16. The method of displaying an infrared target simulation image according to claim 10, wherein said step of providing a plurality of tiles further comprises where each of said plurality of emitters emits in differing portions of the infrared spectrum.

17. The method of displaying an infrared target simulation image according to claim 10, wherein said step of providing a plurality of tiles further comprises where said plurality of infrared emitters comprise
    a first emitter operates at about 880 nm;
    a second emitter operates at about 950 nm;
    a third emitter operating at about 2 μm—about 9.5 μm; and
    a fourth emitter operates at about 9.5 μm—about 20 μm wavelengths.

18. The method of displaying an infrared target simulation image according to claim 10 wherein said step of providing a plurality of tiles further comprises where said plurality of infrared emitters further comprise
    a first LED type emitter operates at about 850 nm,
    a second LED type emitter operates at about 950 nm, a foil coil-type thermal emitter includes a calcite band pass filter, which operates at about 2 μm to about 9.5 μm; and a microelectromechanical film type thermal emitter includes a germanium long pass filter, which operates at about 9.5 μm to about 20 μm.

* * * * *